United States Patent [19]
Ball et al.

[11] 3,935,395
[45] Jan. 27, 1976

[54] SELECTIVE SIGNAL RECEIVER FOR USE IN TELECOMMUNICATION SYSTEMS

[75] Inventors: Herbert Ball, Stuttgart; Wolf Ohl, Korntal, both of Germany

[73] Assignee: International Standard Electric Corporation, New York, N.Y.

[22] Filed: Aug. 2, 1974

[21] Appl. No.: 494,287

[30] Foreign Application Priority Data
Aug. 16, 1973 Germany................................ 2341225

[52] U.S. Cl. ............................................. 179/84 VF
[51] Int. Cl.[2]......................................... H04M 1/50
[58] Field of Search .............. 179/84 VF; 324/78 D; 328/138

[56] References Cited
UNITED STATES PATENTS
3,537,001  10/1970  Friend.............................. 324/78 D
3,760,269  9/1973  Beeman............................ 324/78 D
3,790,720  2/1974  Schartmann.................... 179/84 VF Primary Examiner—Kathleen H. Claffy
Assistant Examiner—Joseph Popek
Attorney, Agent, or Firm—J. B. Raden; D. P. Warner

[57] ABSTRACT

A selective digital signal receiver is disclosed in which the time distances between zero crossings of the input voltages are measured with a counter which is controlled at a clock frequency higher than the signal frequency. Each measurement covers a predetermined number of cycles. The greater the number of cycles chosen, the less the bandwidth must be widened for the zero-crossing shifts caused by noise.

5 Claims, 5 Drawing Figures

Fig.1

SELECTIVE SIGNAL RECEIVER FOR USE IN TELECOMMUNICATION SYSTEMS

BACKGROUND OF THE INVENTION

1. Field of the Invention

The present invention relates to a selective signal receiver for use in telecommunications and particularly in telephone systems. With the present invention, the time distances between zero crossings of the input voltage are measured with a counter which is controlled at a clock frequency higher than the signal frequency to be determined, and the input voltage is evaluated as a signal only if the measured value lies between a lower and an upper count determining the bandwidth.

2. Description of the Prior Art

Such signal receivers are disclosed in German Printed Applications Nos. 2,145,886 and 2,156,123, by way of example. In these known signal receivers, the counter determines during each measurement the time distance between two adjacent zero crossings or between the zero crossings at the beginning and at the end of a single cycle of the input voltage. With this prior art problems arise since, in addition to the signal frequencies, interfering signals frequently appear at the inputs of signal receivers. These interfering signals may shift the zero crossings of the input voltage to such an extent that the known digital signal receivers cannot make an accurate signal recognition.

SUMMARY OF THE INVENTION

It is an object of the present invention to provide a selective signal receiver of the kind referred to by way of introduction which permits accurate signal recognition despite existing interfering signals and, in particular, requires only a relatively narrow bandwidth. The invention is characterized in that each measurement covers a plurality of cycles whose number is predetermined and is counted with a zero-crossing counter, and that the lower count and the upper count of the clock-frequency counter are chosen depending on the predetermined number of cycles, on the predetermined tolerances of the signal frequencies, and on permissible interference-voltage components.

In an improvement of the invention, the predetermined number of cycles is chosen depending on the predetermined signal-to-noise ratio. In this manner, the signal recognition also takes into account the amplitude of the interfering signal.

BRIEF DESCRIPTION OF THE DRAWINGS

The invention will now be explained with reference to the accompanying drawings, in which.

DESCRIPTION OF A PREFERRED EMBODIMENT

Figure 1:
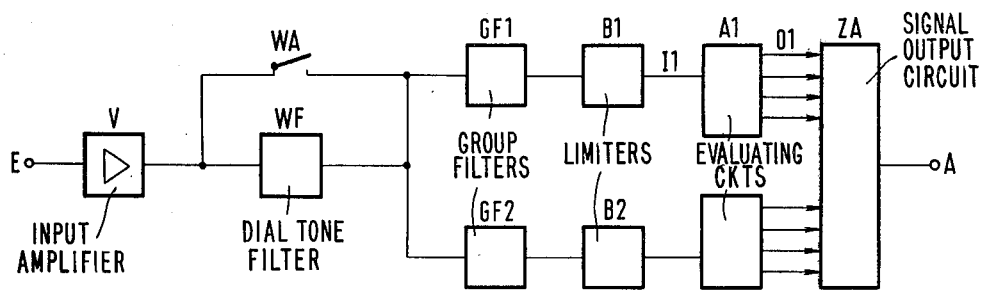
FIG. 1 is a block diagram of a signal receiver for a twogroup code in accordance with the invention.

The signal receiver of FIG. 1 serves as a dial code signal receiver in telephone systems. During dialling, each dialled digit is formed by generating and transmitting signals at two different frequencies one of which belongs to a first frequency group, while the second belongs to a second frequency group.

The frequencies of signals in the first frequency group may have values such as 697, 770, 852 and 941 Hz, for example, while signals in the second frequency group may consist of the frequencies 1,209, 1,336, 1,477 and 1,633 Hz. The two-frequency signals are generated in the subscriber sets by means of signal generators. Because of the signal-generator tolerances, each signal frequency lies within a range of $f_o + \Delta f_o/2$. The signal received at the input E is first amplified in an input amplifier v, then passed when the switch WA is open as shown through a dial-tone fitter WF, and subsequently applied to the group filters $GF_1$, $GF_2$ where the signals comprising the two frequency groups are separated. If the received signal is composed of two dial code frequencies, the separation of the two frequencies is effected by means of these group filters. Each of the signal voltages associated with these frequencies is used to control a limiter B1, B2, which converts the sinusoidal signal voltage to a square-wave voltage. One square-wave voltage is applied (via one input I1) to an evaluating circuit A1, and the other square-wave voltage is fed to an evaluating circuit A2. The evaluating circuits determine whether the frequency of the received signal lies within predetermined ranges allotted to the code dial frequencies. The result of the evaluating circuit is transferred via the four outputs (01) of each evaluating circuit A1, A2 to a signal output circuit ZA which checks whether a signal frequency is present in each frequency group. If that is the case, the code signal is delivered via the output A.

Figure 2:
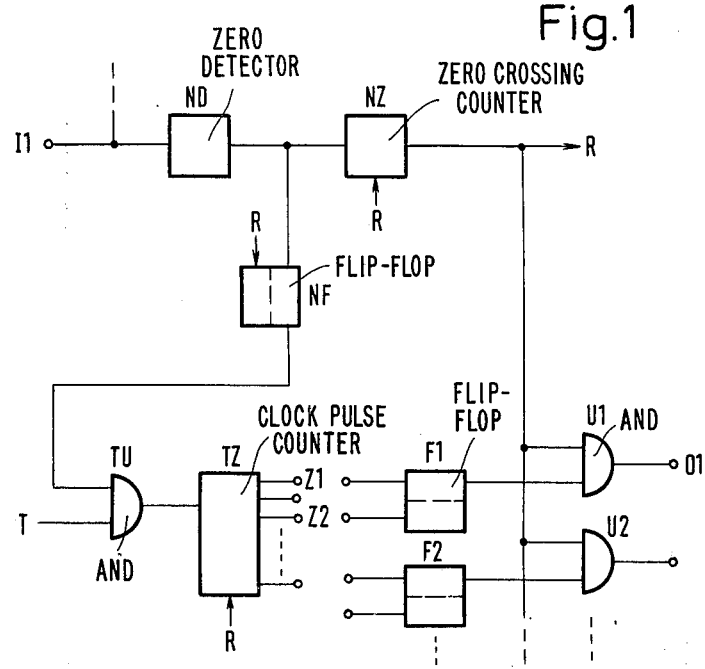
FIG. 2 is a schematic diagram of a portion of an evaluating circuit as shown in FIG. 1 which portion is essential to the invention.

FIG. 2 shows a schematic diagram of a portion of an evaluating circuit, e.g. of the evaluating circuit A1 of FIG. 1. The square-wave voltage is fed through the input I1, to which additional circuits for improving speech immunity (not shown) are connected, to a zero detector ND which delivers a spike each time the square-wave voltage passes through zero. These spikes are counted by a zero-crossing counter NZ whose counting capacity is adjustable. When the adjusted end position of the zero-crossing counter NZ is reached, the latter provides a reset pulse R and resets itself and other circuits at the reset inputs R.

The first spike of the zero-crossing detector ND also sets a flip-flop NF, which then opens an AND-circuit TU for the passage of clock pulses arriving at the input T. The clock pulses, coming from a clock generator (not shown), have a relatively high frequency as compared to the signal frequencies to be determined and are counted by a clock-pulse counter TZ until resetting is effected by the zero-crossing counter NZ.

The clock-pulse counter TZ has a number of outputs. For each code signal frequency a lower count and an upper count can be tapped. It is assumed, for example, that an output Z1 allotted to the lower count and an output Z2 allotted to the upper count are provided for the frequency $f_1$. The output Z1 is connected to the set input of a flip-flop F1, whose reset input is connected to the output Z2. Analogously, a flip-flop F2 allotted to the frequency $f_2$ and two additional flip-flops (not shown) are connected to associated outputs of the clock-pulse counter TZ. The outputs of these flip-flops are connected, respectively, to one input of individually associated AND-circuits U1, and U2. . ., whose other inputs are connected to the reset output R of the zero-crossing counter NZ. The outputs of these AND-circuits are connected to the signal output circuit ZA as is indicated by the output O1 of the AND-circuit U1 in FIGS. 1 and 2.

If the value counted during the time between the setting of the flip-flop NF and the resetting of the zero-crossing counter NZ lies between the values Z1 and Z2, the flip-flop F1 is in its "on" state. Then, as an indication that the frequency $F_1$ has been determined, an output signal is delivered via the output O1 when the end position of the zerocrossing counter NZ has been reached and the output R thus having been marked. According to the invention, each measurement covers a plurality of cycles of the alternating voltage applied to the input I1. The number of cycles is predetermined by the selection of the end position of the zero-crossing counter NZ. The lower count Z1 and the upper count Z2 as well as the analogous counts for the other frequencies are chosen depending on the predetermined number of cycles, on the predetermined tolerances of the signal frequencies, and on permissible interference-voltage components. This proportioning rule will now be explained with the aid of FIGS. 3, 4 and 5.

Figure 3:
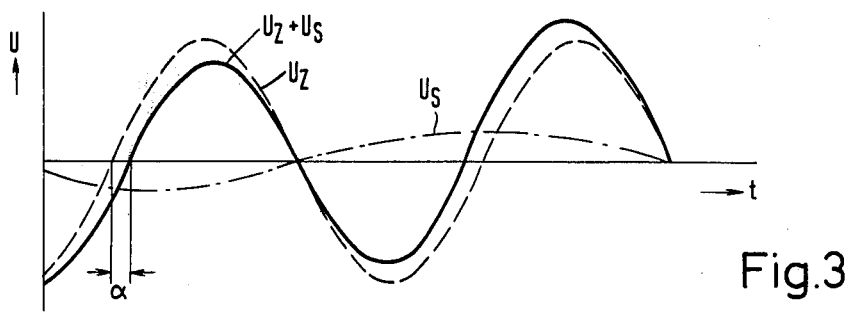
FIG. 3 is a voltage diagram showing waveforms of a signal voltage, of an interference voltage, and of the sum voltage from these voltages.
Figure 4:
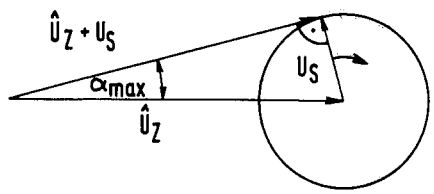
FIG. 4 is a vector diagram of the voltages of FIG. 3.

The effect of an interference voltage on the signal voltage at the input E (FIG. 1) is apparent from FIG. 3. An interference voltage $U_S$ influences a signal voltage $U_Z$ in such a manner that zero crossings of the sum voltage $U_Z+U_S$ are shifted with respect to zero crossings of the signal voltage $U_Z$ by the angle $\alpha$. The maximum shift follows from the vector representation of the voltages $\hat{U}_Z$, $U_S$ AND $\hat{U}_Z+U_S$ in FIG. 4, with the vector $U_S$ rotating around the head of the vector $\hat{U}_Z$, and is:

$$\sin \alpha_{max} = \frac{\hat{U}_S}{U_Z}.$$

If each measurement covers a plurality of cycles, the absolute error turns out to be constant at $2\alpha_{max}$, while the relative error decreases as a function of the number of cycles and is:

$$F_{jmax} = \frac{2\alpha_{max}}{180\, p_H}.$$

For the limit values of the bandwidth:

$$f_{e1} = (f_o + \frac{\Delta f_o}{2})(1 + \frac{2\alpha_{max}}{180\, p_H}),$$

$$f_{e2} = (f_o - \frac{\Delta f_o}{2})(1 - \frac{2\alpha_{max}}{180\, p_H}),$$

where $f_o$ is the nominal signal frequency, $\Delta f_o$ is the permissible frequency-variation range related to the nominal signal frequency and essentially dependent by the permissible tolerance of the signal-frequency generators, $\delta_{max}$ is the zero shift angle, and $P_H$ is the number of half cycles of the input voltage to be measured.

Figure 5:
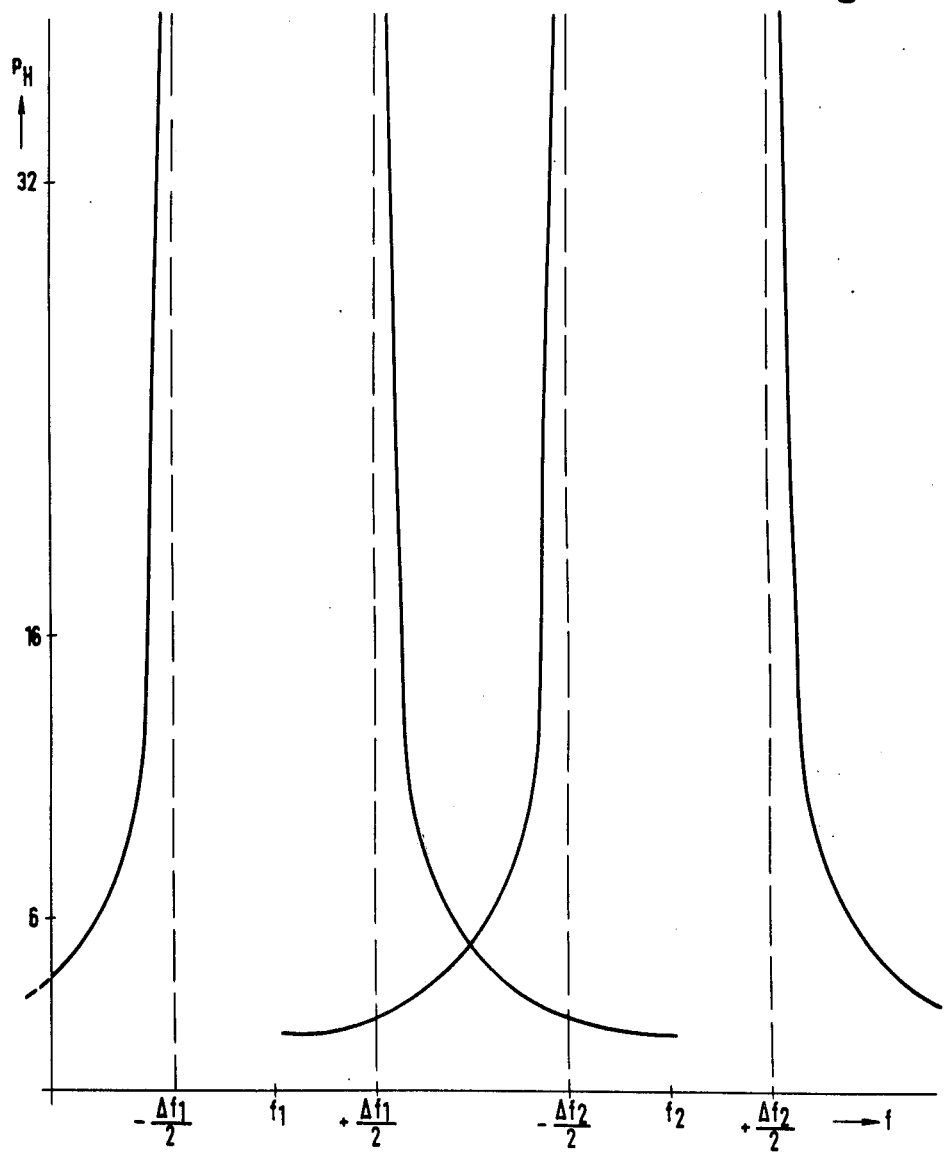
FIG. 5 is a diagram which gives the bandwidth of the signal receiver as a function of the number of half cycles measured.

FIG. 5 shows the bandwidth curves of two adjacent signal frequencies as a function of the number of half cycles $p_H$ per measurement, with predetermined values for $f_o$, $\Delta f_o$ and $\delta_{max}$ taken as a basis. If, for example, the signal frequencies $f_1=697$ Hz and $f_2=770$ Hz are the adjacent signal frequencies, $\Delta f_1$ and $\Delta f_2$ are chosen to be $1.8 \cdot 10^{-2} f_1$ and $1.8 \cdot 10^{-2} f_2$, respectively, and, assuming a typical signal-to-noise ratio of 12 db so that $$\alpha_{max} = \arcsin \frac{\hat{U}_S}{U_Z} = \arcsin \frac{1}{4} = 14.5°,$$

it will be apparent from FIG. 5 that, if only six half cycles per measurement are taken as a basis, a bandwidth sufficient for frequency determination is achieved. If the number of half cycles increases, a smaller bandwidth can be achieved and/or a smaller signal-to-noise ratio can be permitted; on the other hand, the distance between the adjacent frequencies $f_1$, $f_2$ could be reduced as well.

What is claimed is:

1. A selective signal receiver for use in telecommunication and particularly telephone systems wherein the time distances between zero crossings of the input voltage are measured with a counter which is controlled at a clock frequency higher than the signal frequency to be determined, and wherein the input voltage is evaluated as a signal only if the measured value lies between a lower and an upper count determining the bandwidth, wherein the improvement comprises a zero crossing detector coupled to provide a pulse each time the input voltage crosses zero, a zero crossing counter coupled to the zero crossing detector to count a predetermined number of said pulses indicating zero crossings of an input signal and the zero crossing counter providing a reset signal when that number is reached, a clock pulse counter coupled to start when the pulse including the first zero crossing occurs, where the lower count and the upper count of the clock pulse counter are chosen depending on the predetermined number of cycles, on the predetermined tolerances of the signal frequencies, and on permissible interference-voltage components.

2. A selective signal receiver according to claim 1, in which the predetermined number of cycles is chosen depending on the predetermined signal-to-noise ratio (e.g. 12 db).

3. A selective signal receiver for use in telecommunication and particularly telephone systems comprising a zero detector for receiving input voltages and providing zero-crossing pulses, first counter means coupled to the zero detector for measuring the time distances between selected zero crossings of an input voltage, second counter means coupled to receive signals from said zero detector and to receive clock signals at a frequency higher than the signal frequency to be determined, and means for evaluating the input voltage as a signal only if the measured time distance lies between a lower and an upper count, each measurement covering a predetermined number of cycles counted with the first counter means, the lower count and the upper count of the second counter being chosen depending on the predetermined number of cycles, on the predetermined tolerances of the signal frequencies, and on permissible interference-voltage components.

4. The invention as claimed in claim 3, in which the zero detector is responsive to the input signal to provide a spike in response to each zero crossing and the receiver includes means applying each said spike to the first counter to cause it to operate.

5. The invention as claimed in claim 4, and including flip-flop means responsive to a spike from said zero detector to enable the second counter to receive said clock signals.

* * * * *